(12) United States Patent
Nakao (10) Patent No.: US 12,524,408 B2
(45) Date of Patent: Jan. 13, 2026

(54) ANALYSIS METHOD MANAGEMENT SYSTEM

(71) Applicant: SHIMADZU CORPORATION, Kyoto (JP)

(72) Inventor: Takashi Nakao, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 18/401,513

(22) Filed: Dec. 31, 2023

(65) Prior Publication Data
US 2024/0273100 A1 Aug. 15, 2024

(30) Foreign Application Priority Data
Feb. 14, 2023 (JP) .................. 2023-020766

(51) Int. Cl.
*G06F 16/20* (2019.01)
*G06F 16/2455* (2019.01)

(52) U.S. Cl.
CPC ................ *G06F 16/2455* (2019.01)

(58) Field of Classification Search
CPC .......... G06F 16/2455; G01N 35/00584; G01N 30/8696; G01N 35/00871
See application file for complete search history.

(56) References Cited

U.S. PATENT DOCUMENTS

| | | | |
|---|---|---|---|
| 10,762,060 B1* | 9/2020 | Faulkner | G06F 7/14 |
| 2010/0293447 A1* | 11/2010 | Kadowaki | G06F 40/268 |
| | | | 715/201 |
| 2011/0302556 A1* | 12/2011 | Drukman | G06F 8/33 |
| | | | 717/113 |
| 2014/0040323 A1* | 2/2014 | Nakao | G01N 30/8658 |
| | | | 707/812 |
| 2016/0154844 A1* | 6/2016 | Park | G06F 16/51 |
| | | | 707/722 |
| 2020/0302363 A1* | 9/2020 | Maar | G06Q 10/06315 |
| 2021/0231623 A1* | 7/2021 | Kimoto | G01N 35/00584 |
| 2021/0382881 A1* | 12/2021 | Ishikawa | G06F 40/30 |
| 2023/0019010 A1* | 1/2023 | Tiwari | G06F 11/3072 |

FOREIGN PATENT DOCUMENTS

| | | | |
|---|---|---|---|
| CN | 108876684 A | * 11/2018 | |
| JP | 2014-029270 A | 2/2014 | |
| WO | WO-2010086862 A1 | * 8/2010 | G06Q 10/00 |

OTHER PUBLICATIONS

Article entitled "LabSolutions Operators Guide", by Shimadzu, dated Apr. 2017 (Year: 2017).*
Article entitled "Cosine Similarity Calculation Between Two Matrices in MATLAB", by GeeksforGeeks, dated Feb. 8, 2023 (Year: 2023).*

* cited by examiner

*Primary Examiner* — Mahesh H Dwivedi
(74) *Attorney, Agent, or Firm* — Renner, Otto, Boisselle & Sklar, LLP (57) ABSTRACT

A method database (6) that stores existing methods that are analysis method used in analyses performed in the past, a new method creator (12) that is configured to display a new method edit screen to display a method edit window on a display (4), and to create a new method based on a condition parameter set in the method edit window, and a similar method search part (14) that is configured to search for an existing method similar to the new method being created from the existing methods stored in the method database (6) as a similar method while the new method edit screen is displayed.

8 Claims, 8 Drawing Sheets

ANALYSIS METHOD

PUMP

FLOW RATE: 1.5000 mL/min
PRESSURE UPPER LIMIT: 130.0 Mpa
: :

SAMPLER

INJECTION AMOUNT: 1.0 μL
COOLER TEMPERATURE: 15 °C
: :

SAMPLE NAME: A    IS INCLUDED ▶

ORDER OF RELATIONSHIP WITH METHOD ▶

SAMPLE A
★★★ | METHOD A | CHROMATOGRAM | PEAK TABLE | CALIBRATION CURVE |

ISOMER OF SAMPLE A
★★★ | METHOD A | CHROMATOGRAM | PEAK TABLE | CALIBRATION CURVE |

SAMPLE A'
★★ | METHOD A | CHROMATOGRAM | PEAK TABLE | CALIBRATION CURVE |

ANALYSIS METHOD

PUMP

FLOW RATE: 1.5000 mL/min

PRESSURE UPPER LIMIT: 130.0 Mpa

...
...

SAMPLER

INJECTION AMOUNT: 1.0 μL

COOLER TEMPERATURE: 15 °C

...
...

CONVERSION INTO METHOD MATRIX

METHOD MATRIX 1: ["1.5000", "130.0", ... ]

METHOD MATRIX 2: ["1.0", "15", ... ]

| METHOD NAME | METHOD MATRIX 1 | METHOD MATRIX 2 | METHOD MATRIX 3 | COMPREHENSIVE EVALUATION |
|---|---|---|---|---|
| METHOD A | 0.95 | 0.95 | 0.7 | 0.87 |
| METHOD B | 0.95 | 0.8 | 0.7 | 0.82 |
| METHOD C | 0.7 | 0.95 | 0.9 | 0.85 |

FIG. 6

| METHOD NAME | METHOD MATRIX 1 | ~~METHOD MATRIX 2~~ | METHOD MATRIX 3 | COMPREHENSIVE EVALUATION |
|---|---|---|---|---|
| METHOD A | 0.95 | ~~0.95~~ | 0.7 | 0.83 |
| METHOD B | 0.95 | ~~0.8~~ | 0.7 | 0.83 |
| METHOD C | 0.7 | ~~0.95~~ | 0.9 | 0.8 |

FIG. 7

PRIORITY OF
SIMILARITY EVALUATION

1. PUMP (FLOW RATE, GRADIENT)

2. SAMPLER (CLEANING)

3. PUMP (PRESSURE)

4. SAMPLER (TEMPERATURE)

5. OVEN

6. DETECTOR (WAVELENGTH)

7. DETECTOR (SAMPLING)

8. DETECTOR (LAMP TYPE)

FIG. 9

ANALYSIS METHOD MANAGEMENT SYSTEM

BACKGROUND OF THE INVENTION

1. Field of the Invention

The present invention relates to an analysis method management system for creating and managing an analysis method for analysis performed by an analysis device such as a liquid chromatograph.

2. Description of the Related Art

In order to perform analysis with an analysis device such as a liquid chromatograph, it is necessary to set an analysis condition by setting a plurality of condition parameters such as a type of column, a sample injection amount, a temperature of a column oven, a type of mobile phase, and a flow rate of a mobile phase. However, it is troublesome for the user to input these condition parameters to set an analysis condition each time analysis is performed. In view of the above, an analysis condition set once is stored in a database as an analysis method, and a control unit of an analysis device reads the analysis method to control each device at the time of analysis (see, for example, JP 2014-029270 A).

Further, when an analysis condition of new analysis is set, an existing analysis method stored in a database can be directly used, or a new analysis method can be created by changing some condition parameters of an existing analysis method.

SUMMARY OF THE INVENTION

When an analysis method is newly created, it is easy to create an appropriate analysis method if it is possible to predict what kind of analysis result will be obtained when analysis is performed with the analysis method being created. However, in order to predict an analysis result obtained by an analysis method being created, it is necessary to perform troublesome work to find out an analysis method having a condition parameter similar to that of the analysis method being created while checking analysis methods stored in a database one by one, and further to find out an analysis result obtained by using the found analysis method.

Work of checking existing analysis methods stored in a database one by one to find an analysis method similar to an analysis method being created is extremely troublesome. There is also a method of creating a provisional analysis method, executing test analysis, and checking an obtained analysis result, but it is difficult to employ such a method in a case where a sample is valuable. Further, in a case where it takes a long time to condition and analyze an analysis device, it takes a lot of time to check an obtained analysis result, and it is difficult to employ such a method.

The present invention has been made in view of the above problem, and an object of the present invention is to reduce a search load for an existing analysis method similar to an analysis method being created when creating a new analysis method.

An analysis method management system according to the present invention includes a method database that stores existing methods that are analysis methods used in analysis performed in the past, a new method creator configured to display a method edit window on a display, and to create a new method based on a condition parameter set in the method edit window, and a similar method search part configured to search for an existing method similar to the new method being created from the existing methods stored in the method database as a similar method.

According to the analysis method management system according to the present invention, during a new method creation mode, an existing method similar to a new method being created is searched for as a similar method from existing methods stored in a method database, so that a search load for an existing analysis method similar to the analysis method being created can be reduced.

DETAILED DESCRIPTION OF THE INVENTION

Hereinafter, an embodiment of an analysis method management system according to the present invention will be described with reference to the accompanying drawings.

Figure 1:
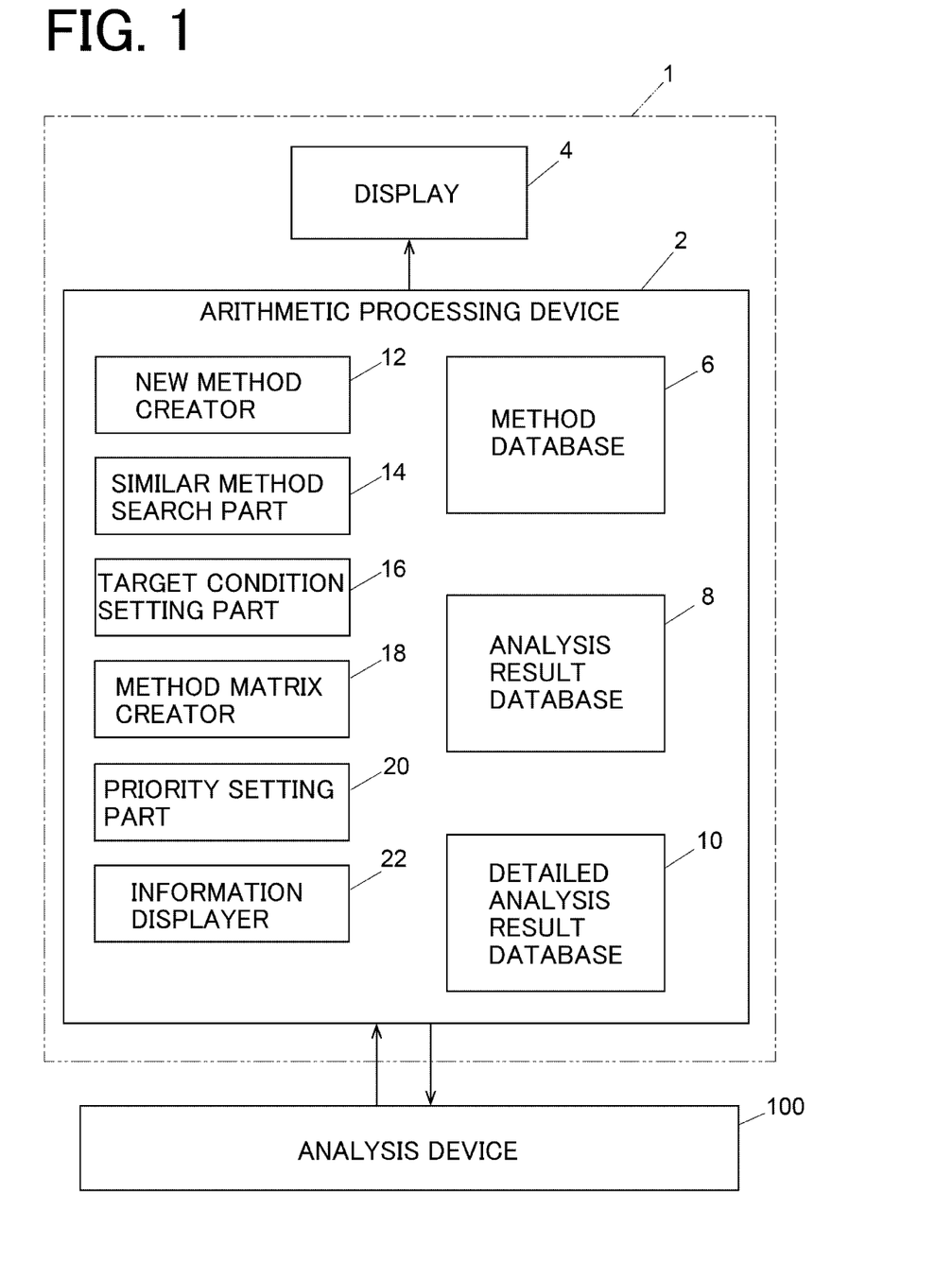
FIG. 1 is a block diagram illustrating an embodiment of an analysis method management system.

As illustrated in FIG. 1, an analysis method management system 1 includes an arithmetic processing device 2 and a display 4. The arithmetic processing device 2 is realized by a computer device (for example, a personal computer) including a central processing unit (CPU), an information storage device, and the like. The arithmetic processing device 2 is provided in a manner able to communicate with an analysis device 100 such as a liquid chromatograph. The analysis method management system 1 has, in addition to a new method creation function of creating an analysis method (new method) for analysis to be newly performed by the analysis device 100, a similar method reference function of, when creating a new method, allowing the user to refer to an existing method (also referred to as a similar method) similar to the new method being created among analysis methods (existing methods) used in analysis performed in the past, an analysis result obtained by using the similar method, and the like. The analysis method management system 1 can provide a created new method to the analysis device 100.

In order to realize the new method creation function and the similar method reference function, the arithmetic processing device 2 of the analysis method management system 1 includes a method database 6, an analysis result database 8, a detailed analysis result database 10, a new method creator 12, a similar method search part 14, a target condition setting part 16, a method matrix creator 18, a priority setting part 20, and an information displayer 22.

The method database 6 is a storage area for storing existing methods together with device configuration of an analysis device in which each existing method is used. The analysis result database 8 is a storage area for storing analysis results obtained by analysis using the existing methods. The analysis results are chromatograms or the like. The analysis results stored in the analysis result database 8 are associated with the existing methods used for analysis in which each of the analysis results are obtained. The detailed analysis result database 10 stores a detailed analysis results obtained by detailed analysis processing of each analysis result stored in the analysis result database 8. The detailed analysis results are peak tables, a calibration curve, or the like. Each detailed analysis result stored in the detailed analysis result database 10 is associated with an existing method used for analysis in which an analysis result on which each piece of detailed analysis processing is based is obtained.

Figure 2:
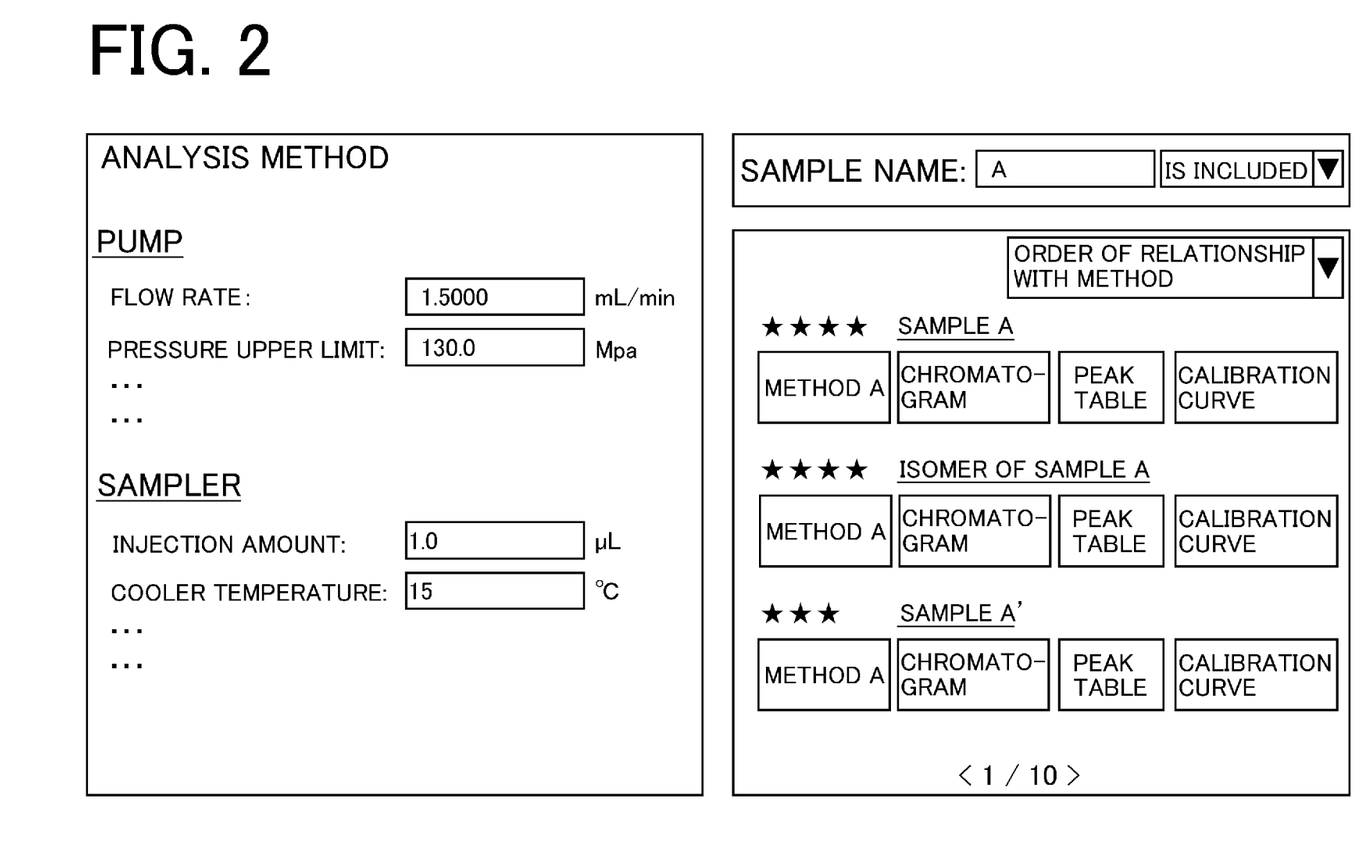
FIG. 2 is an example of a screen displaying information on a similar method simultaneously with a method edit window.

For example, when the user inputs an instruction to create a new method, the new method creator 12 activates a new method edit screen, opens a new method edit window as illustrated in a left part of FIG. 2, causes the user to set each condition parameter, and creates a new method based on the set condition parameter. A lower right window in FIG. 2 is a similar method display window that displays an existing method (similar method) similar to a new method being created. In FIG. 2, in addition to a plurality of similar methods, an analysis result (chromatogram) obtained by analysis using each similar method and a detailed analysis result (peak table and calibration curve) of the analysis result are displayed. An upper right window in FIG. 2 is a target condition setting window for allowing the user to designate a condition for selecting an existing method as a search target when searching for a similar method.

While a new method edit screen is displayed, the similar method search part 14 searches existing methods stored in the method database 6 for an existing method similar to a new method being created. That is, every time a condition parameter is changed in a method edit window, the similar method search part 14 searches for an existing method similar to a new method created by the changed condition parameter in the background. When searching for a similar method, the similar method search part 14 can calculate similarity of an existing method to a new method being created, and can set a predetermined number of existing methods having high similarity as similar methods. Similarity between analysis methods may be any similarity, but in this embodiment, cosine similarity of a method matrix described later is used.

The target condition setting part 16 is a function of setting a condition for selecting an existing method as a search target for a similar method on the basis of input by the user. In FIG. 2, this function is realized by a target condition setting window in an upper right part. When a target condition is set here, the similar method search part 14 filters existing methods stored in the method database 6 with the set target condition, and narrows down the existing methods as a search target for a similar method. By the above, a calculation load caused by searching for a similar method is reduced.

The method matrix creator 18 is a function of creating a method matrix of a new method being created and a method matrix of an existing method.

Figure 3:
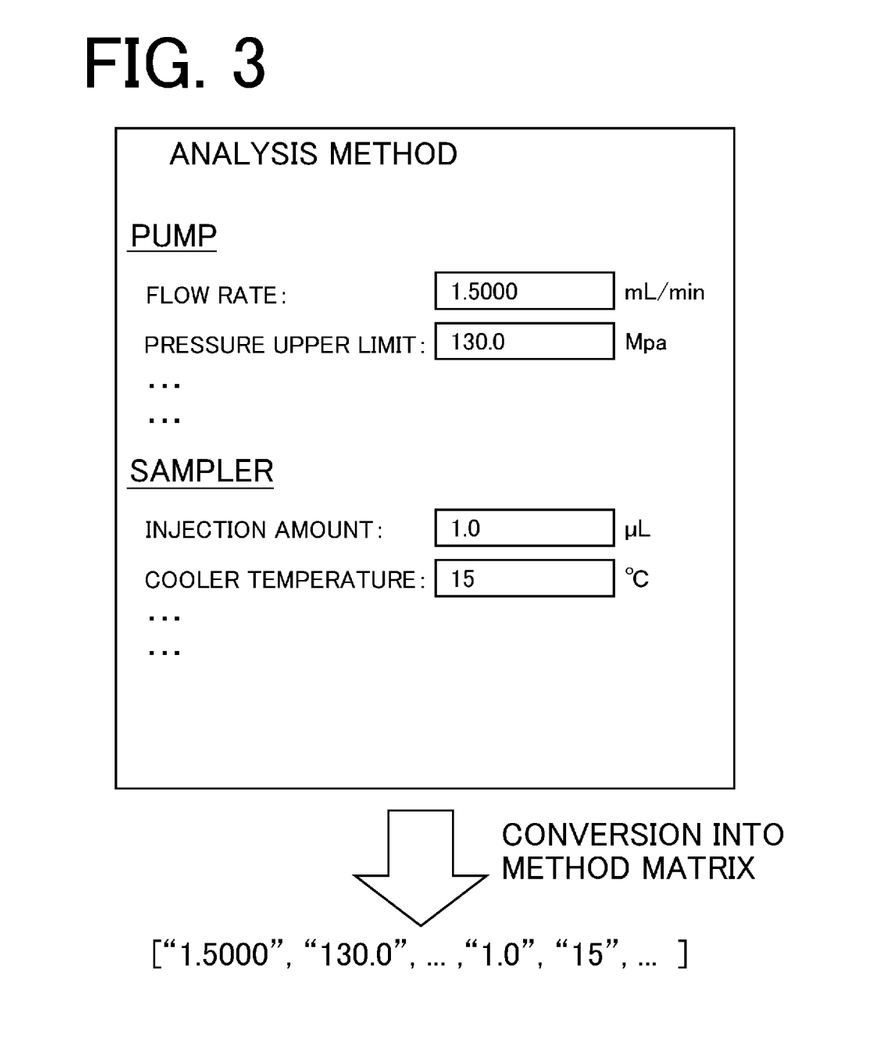
FIG. 3 is a diagram for describing an example of a method of converting a condition parameter of an analysis method into a method matrix.

As a method of creating a method matrix, as illustrated in an example of FIG. 3, there is a method of expressing all condition parameters of an analysis method by one matrix.

Figure 4:
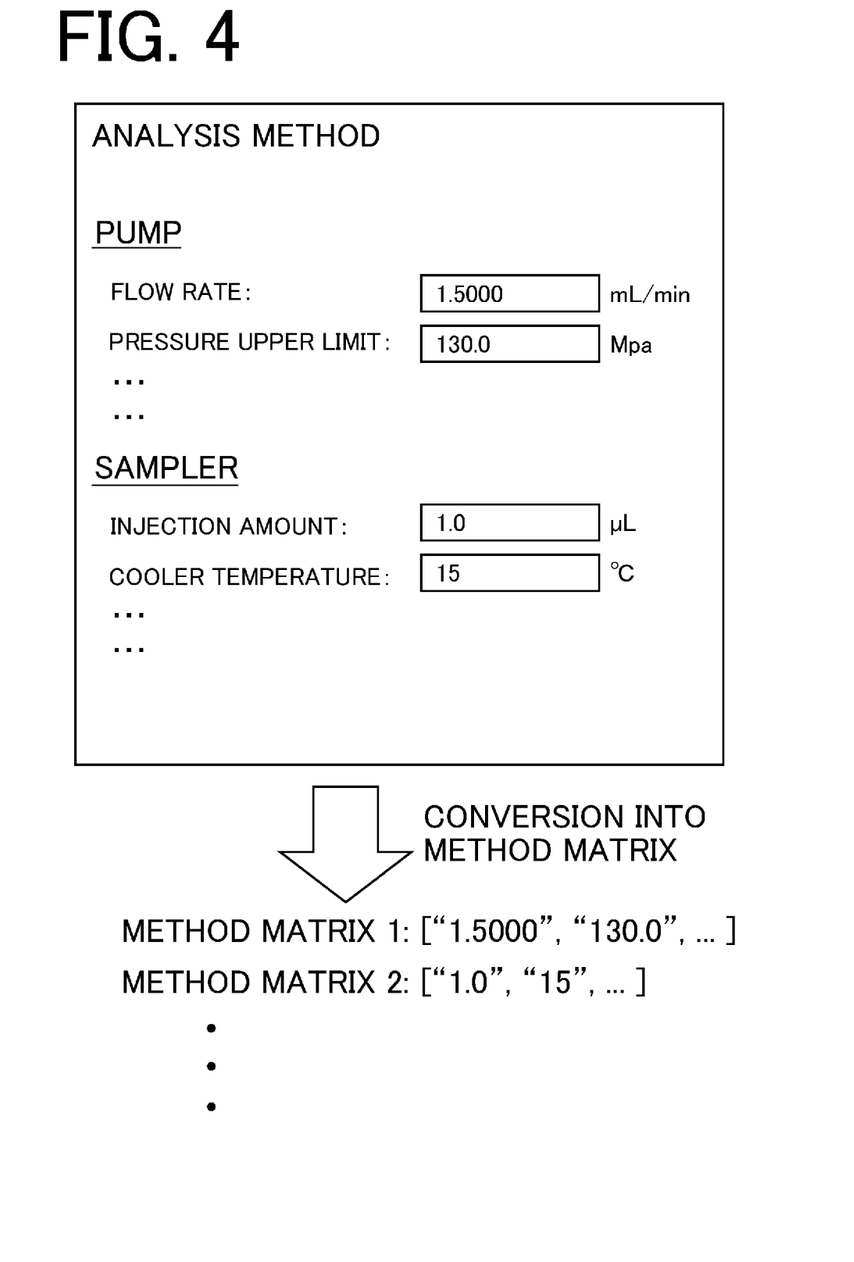
FIG. 4 is a diagram for describing another example of a method of converting a condition parameter of an analysis method into a method matrix.

Further, as a method of creating a method matrix, as illustrated in an example of FIG. 4, there is also a method of creating a plurality of method matrices (Method matrix 1, Method matrix 2, . . . ) from one analysis method by dividing condition parameters of an analysis methods into a plurality of groups and expressing condition parameters belonging to each group by one matrix.

A method matrix of a new method being created is created by the method matrix creator 18 each time a condition parameter is set (changed) while a new method edit screen is displayed. On the other hand, a method matrix of an existing methods may be created by the method matrix creator 18 when a similar method is searched for, or may be created by the method matrix creator 18 when an existing method is stored in the method database 6 and stored in the method database 6 in association with an existing method. By storing a method matrix of an existing method in the method database 6, it is possible to reduce a calculation load when a similar method is searched for.

Returning to FIG. 1, the similar method search part 14 calculates cosine similarity of a method matrix of an existing method as a search target with respect to a method matrix of a new method created by the method matrix creator 18, and searches for a similar method based on the calculated cosine similarity.

In a case where a plurality of method matrices are created for one analysis method by the method matrix creator 18, the similar method search part 14 can perform the search by calculating cosine similarity between corresponding method matrices of a new method and an existing method as a search target and calculating comprehensive evaluation of the cosine similarity. The comprehensive evaluation includes an average value of cosine similarity of each method matrix.

Figure 5:
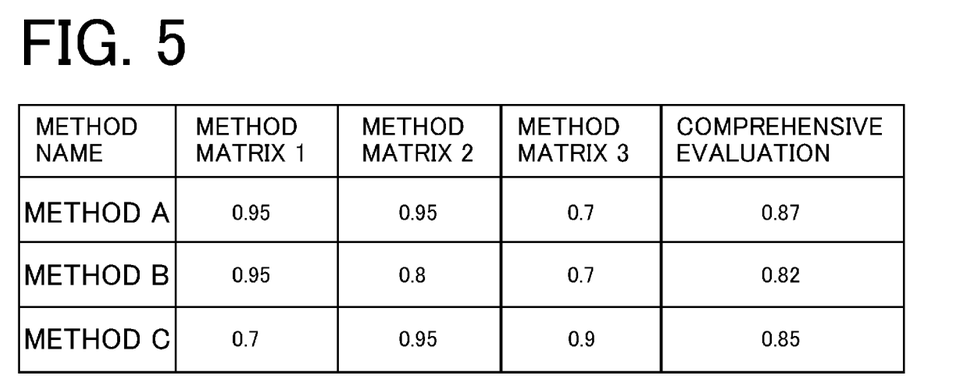
FIG. 5 is a similarity table for describing an example of a method of evaluating similarity of each analysis method in a case where a plurality of method matrices are created from a condition parameter of an analysis method.

As illustrated in FIG. 5, when Methods A to C exist as an existing method as a search target, and three of Method matrices 1 to 3 are created for one analysis method, cosine similarity of Method matrix 1 of each of Methods A to C with respect to Method matrix 1 of a new method being created, cosine similarity of Method matrix 2 of each of Methods A to C with respect to Method matrix 2 of the new method being created, and cosine similarity of Method matrix 3 of each of Methods A to C with respect to Method matrix 3 of the new method being created are calculated. In this example, cosine similarities of Method matrices 1 to 3 of Method A are 0.95, 0.95, and 0.7, respectively. In this case, a value of comprehensive evaluation of similarity to a new method of Method A is $$(0.95 + 0.95 + 0.7)/3 = 0.87.$$

The similar method search part 14 sorts comprehensive evaluation of similarity calculated in this manner in descending order of values, and can set a predetermined number of existing methods as similar methods in descending order of comprehensive evaluation values.

Figure 6:
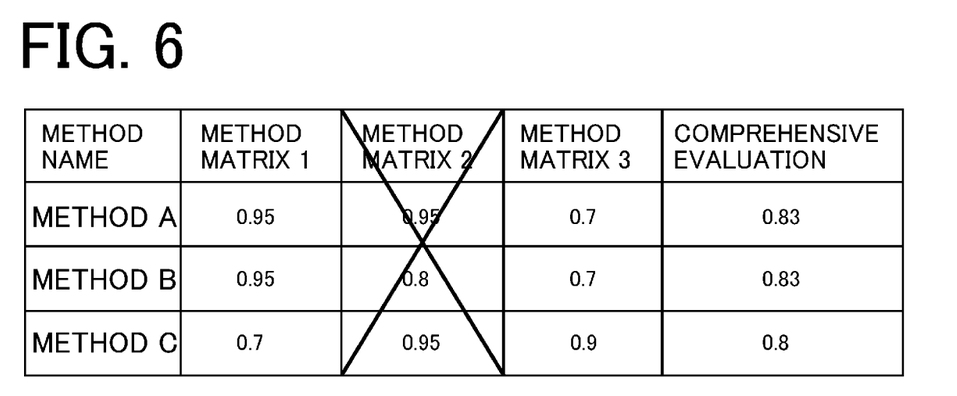
FIG. 6 is a similarity table for describing another example of the method of evaluating similarity of each analysis method in a case where a plurality of method matrices are created from a condition parameter of an analysis method.

Note that the user may be allowed to optionally designate a method matrix to be excluded from a target of comprehensive evaluation of similarity to a new method being created. In this way, a condition parameter that the user considers to be insignificant can be excluded from a calculation target of similarity, and a calculation load at the time of searching for a similar method can be reduced. In an example of FIG. 6, Method matrix 2 is excluded from a calculation target of comprehensive evaluation. By the above, a value of comprehensive evaluation of similarity to a new method of the method A is $$(0.95 + 0.7)/2 = 0.83.$$

Figure 7:
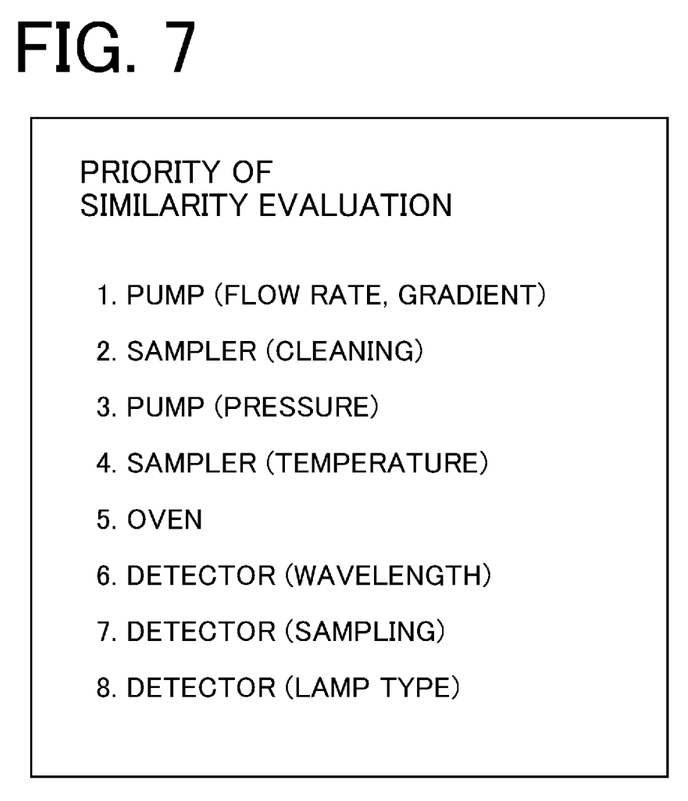
FIG. 7 is an example in which priority is set to each group of a condition parameter of an analysis method.

Further, in a case where condition parameters of an analysis method are divided into a plurality of groups and a method matrix of each group is created, as illustrated in FIG. 7, priority of similarity evaluation may be set for each group. The priority setting part 20 of the arithmetic processing device 2 is a function for setting priority to each group of condition parameters of an analysis method. In a case where priority is set to each group of condition parameters of an analysis method, similarity of a method matrix of each group is weighted according to the priority when a comprehensive evaluation value of similarity of an existing method to a new method is calculated.

For example, in a case where three of Method matrices 1 to 3 are created from one analysis method, it is assumed that higher priorities are set in order of Method matrix 1, Method matrix 2, and Method matrix 3. In this case, in calculation of comprehensive evaluation, a value $X_1$ of similarity of Method matrix 1 is multiplied by a highest coefficient A (for example, 1), a value $X_2$ of similarity of Method matrix 2 is multiplied by a coefficient B (for example, 0.9) lower than the coefficient A, and a value $X_3$ Of similarity of Method matrix 3 is multiplied by a coefficient C (for example, 0.8) lower than the coefficient B. As a result, comprehensive evaluation (average value) of similarity of a certain existing method can be obtained by $$(A \times X_1 + B \times X_2 + C \times X_3)/3.$$

Returning to FIG. 1, the information displayer 22 has a function of displaying a similar method searched by the similar method search part 14 together with other pieces of information such as an analysis result and a detailed analysis result on the same screen as a method edit window, in the example of FIG. 2, in a similar method display window on the right side of the method edit window. Note that, in the example of FIG. 2, all of a similar method, an analysis result, and a detailed analysis result are simultaneously displayed in the similar method display window on the right side of the method edit window, but the present invention is not limited to this, and the configuration may be such that only a part of information of a similar method, an analysis result, and a detailed analysis result is displayed, or the user sets which information to display.

Figure 8:
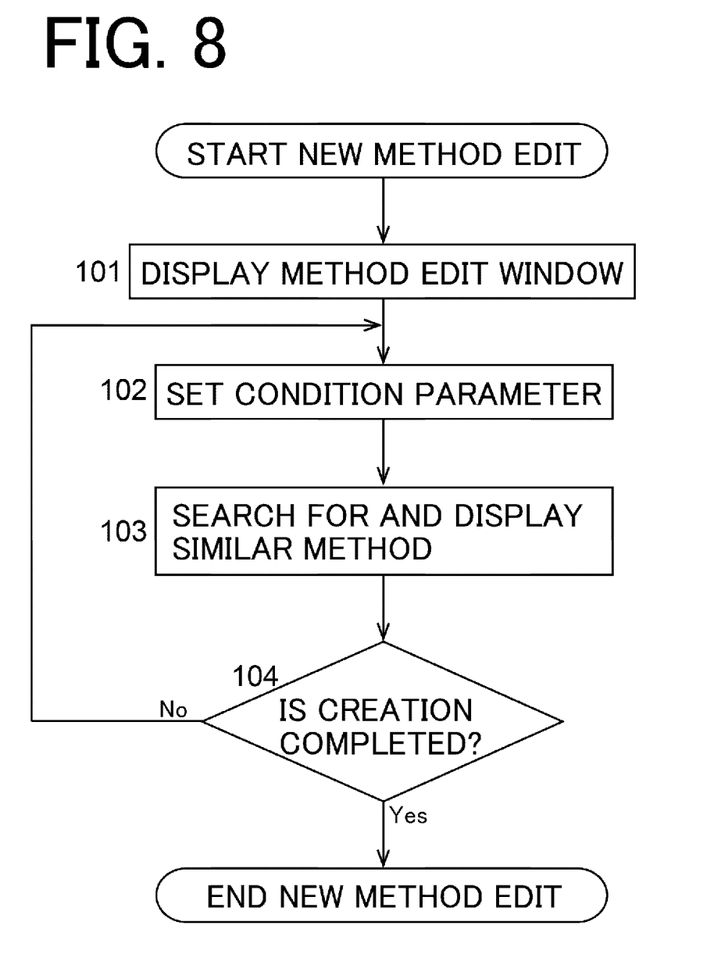
FIG. 8 is a flowchart for describing a process of creating a new method in the embodiment.

Next, an example of a process of creating a new method in the analysis method management system 1 will be described with reference to FIG. 1 and a flowchart of FIG. 8.

When the user inputs an instruction to create a new method to the arithmetic processing device 2, the new method creator 12 displays a new method edit screen and displays a method edit window on the display 4 (Step 101). At this time, a default condition parameter is set to each setting item of the method edit window. When the user changes (sets) any condition parameter in the method edit window (Step 102), the similar method search part 14 searches the method database 6 for an existing method (similar method) similar to a new method reflecting the changed condition parameter, and the information displayer 22 simultaneously displays information on the searched similar method on the same screen as the method edit window (Step 103). A function of the similar method search part 14 and the information displayer 22 is valid until the user completes creation of a new method and ends a new method creation mode (Step 104). By the above, each time the user changes a condition parameter in the method edit window, an analysis method similar to a new method reflecting a changed condition parameter and its related information are displayed in real time in the same screen as the method edit window.

Figure 9:
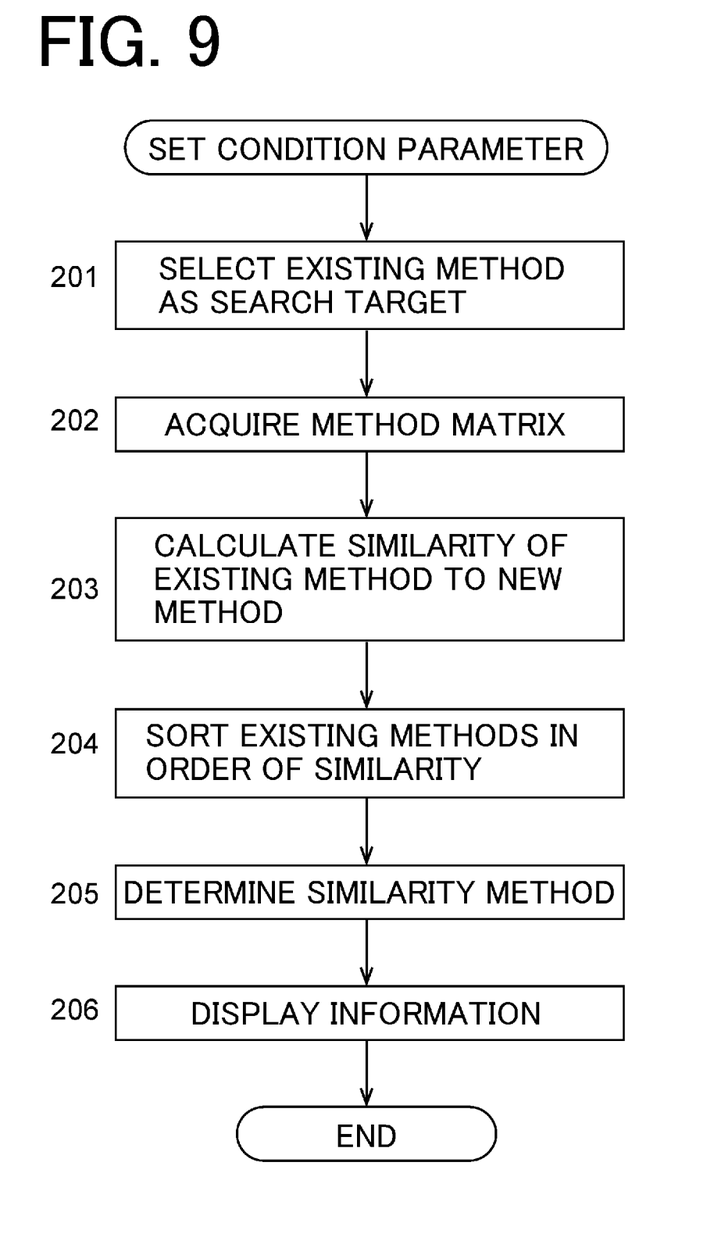
FIG. 9 is a flowchart for describing a process of displaying a similar method in the embodiment.

Next, an example of a process of similar method display in the analysis method management system 1 will be described with reference to FIG. 1 and a flowchart of FIG. 9.

When the user changes any condition parameter on the new method edit screen, the similar method search part 14 extracts an existing method used in analysis performed with the same device configuration as a current device configuration of the analysis device 100 from existing methods stored in the method database 6, and selects an existing method as a search target by performing filtering under a selection condition set by the user (Step 201).

Next, the similar method search part 14 acquires a method matrix of a new method created by the method matrix creator 18 and a method matrix of an existing methods as a search target (Step 202), and calculates cosine similarity of a method matrix of each existing method to a method matrix of a new method (Step 203). Then, the similar method search part 14 sorts existing methods as a search target according to the calculated cosine similarity (Step 204), and displays a predetermined number (for example, five) of existing methods having high similarity to a new method being created as similar methods on the same screen as the method edit window of the display 4 (Step 206).

Note that the embodiment described above is merely an example of an embodiment of the analysis method management system according to the present invention. The embodiment of the analysis method management system according to the present invention is as described below.

An embodiment of the analysis method management system according to the present invention includes a method database that stores existing methods that are analysis methods used in analyses performed in the past,
  a new method creator that is configured to display a new method edit screen to display a method edit window on a display, and to create a new method based on a condition parameter set in the method edit window, and
  a similar method search part that is configured to search for an existing method similar to the new method being created from the existing methods stored in the method database as a similar method while the new method edit screen is displayed.

An aspect [1] of an embodiment of the analysis method management system further includes an information displayer configured to display the similar method searched for by the similar method search part on the display simultaneously with the method edit window. According to this aspect [1], the user can easily refer to an existing method similar to a new method being created.

An aspect [2] of an embodiment of the analysis method management system further includes an analysis result database that stores analysis results of analysis in the past performed using the existing methods stored in the method database in a state where each of the analysis result is in association with corresponding existing method. The information displayer is configured to read, from the analysis result database, an analysis result obtained by analysis using the similar method searched for by the similar method search part, and to display the read analysis result on the display simultaneously with the method edit window. According to this aspect [2], the user can easily refer to an analysis result obtained in analysis in the past using an existing method similar to a new method being created. This aspect [2] can be combined with the above aspect [1].

In the aspect [2], an example of the analysis results are chromatograms.

In an aspect [3] of an embodiment of the analysis method management system, the similar method search part is configured to select search target method from the existing methods stored in the method database according to a predetermined condition, and to search for the similar method from the selected search target method. According to this aspect [3], since the number of existing methods as a search target for a similar method can be reduced, a calculation load at the time of searching for a similar method is reduced. This aspect [3] can be combined with the above aspects [1] and/or [2].

In the aspect [3], the method database may be configured to store the existing methods in association with a configuration of an analysis device that performs analysis using each of the existing methods, and the predetermined condition may be that a configuration of an associated analysis device is the same as a configuration of an analysis device by which the new method being created is used. By the above, a search target for a similar method can be narrowed down to an existing method used in an analysis device having the same configuration as an analysis device in which a new method is used.

Further, the aspect [3] further includes a target condition setting part configured to set a selection condition for selecting the existing method as a search target based on input information by a user, and the similar method search part is configured to select the search target method according to the selection condition set by the target condition setting part. This makes it possible to narrow down search target method for a similar method under a condition desired by the user.

An aspect [4] of an embodiment of the analysis method management system further includes a method matrix creator configured to create a method matrix comprising the condition parameter of the analysis method, and the similar method search part is configured to search for the similar method based on cosine similarity of the method matrix of the existing method to the method matrix of the new method. This aspect [4] can be combined with the above aspects [1], [2], and/or [3].

In a variation of the aspect [4], the condition parameters of the analysis method are divided into a plurality of groups, the method matrix creator is configured to create the method matrix for each of the groups of the analysis method, and the similar method search part is configured to calculate cosine similarity of the method matrix for each of the groups of the existing method to the method matrix for each of the groups of the new method, and to search for the similar method based on comprehensive evaluation of cosine similarity of the method matrix for each of the groups. According to this variation, a calculation load of cosine similarity between method matrices can be reduced as compared with a case where one method matrix is created using all condition parameters of an analysis method.

In the variation of the aspect [4], the comprehensive evaluation may be an average value.

In the above case, a priority setting part configured to set priority to each group of the analysis method based on input information by a user may be further included, and the similar method search part may be configured to calculate the average value after performing weighting according to a level of the priority of each group on the cosine similarity of a method matrix for each of the groups.

DESCRIPTION OF REFERENCE SIGNS 1 analysis method management system
2 arithmetic processing device
4 display
6 method database
8 analysis result database
10 detailed analysis result database
12 new method creator
14 similar method search part
16 target condition setting part
18 method matrix creator
20 priority setting part
22 information displayer
100 analysis device

What is claimed is:

1. An analysis method management system including a CPU and an information storage device, wherein
   the information storage device comprises:
   a method database that stores a plurality of existing methods that are analysis methods used in analysis performed in past; and
   an analysis result database that stores a plurality of analysis results of analysis in the past performed using the plurality of existing methods stored in the method database in a state where each of the plurality of analysis results are in association with corresponding existing methods respectively, the plurality of analysis results being chromatograms or results each gained by analyzing the chromatograms respectively,
   the CPU is configured to
   display a new method edit screen and cause a user to set condition parameters for creating a new method on the new method edit screen,
   create the new method based on the condition parameters set by the user while keeping the new method edit screen displayed,
   calculate similarity to the new method for each of the plurality of existing methods while keeping the new method edit screen displayed,
   identify an existing method having the highest similarity to the new method among the plurality of existing methods as a similar method and an analysis result corresponding to the similar method among the plurality of analysis methods stored in the analysis result database while keeping the new method edit screen displayed, and
   display the similar method and the analysis result corresponding to the similar method on the new method edit screen.

2. The analysis method management system according to claim 1, wherein the CPU is configured to select search target methods from the plurality of existing methods stored in the method database according to a predetermined condition, and to search for the similar method from the selected search target methods.

3. The analysis method management system according to claim 2, wherein
the method database is configured to store the plurality of existing methods in association with a configuration of an analysis device that performs analysis using each of the existing methods, and
the predetermined condition is that a configuration of an associated analysis device is the same as a configuration of an analysis device by which the new method being created is used.

4. The analysis method management system according to claim 2, wherein the CPU is configured to set a selection condition for selecting the search target methods based on input information by the user, and
the CPU is configured to select the search target methods according to the selection condition.

5. The analysis method management system according to claim 1, wherein the CPU is configured to create a method matrix comprising the condition parameters of the analysis method, and
the CPU is configured to search for the similar method based on cosine similarity of the method matrix of each of the plurality of existing methods to the method matrix of the new method.

6. The analysis method management system according to claim 5, wherein
the condition parameters of the analysis method are divided into a plurality of groups,
the CPU is configured to create the method matrix for each of the groups of the analysis method, and
the CPU is configured to calculate cosine similarity of the method matrix for each of the groups of the existing method to the method matrix for each of the groups of the new method, and to search for the similar method based on comprehensive evaluation of cosine similarity of the method matrix for each of the groups.

7. The analysis method management system according to claim 6, wherein the comprehensive evaluation is an average value.

8. The analysis method management system according to claim 7, wherein the CPU is configured to set priority to each group of the analysis method based on input information by the user, and
the CPU is configured to calculate the average value after performing weighting according to a level of the priority of each group on the cosine similarity of a method matrix for each of the groups.

* * * * *